United States

[11] 3,580,663

[72] Inventor Harris Vern..
 Lichfield, England
[21] Appl. No. 758,855
[22] Filed Sept. 10, 1968
[45] Patented May 25, 1971
[73] Assignee Joseph Lucas (Industries) Limited
 Birmingham, England
[32] Priority Sept. 11, 1967
[33] Great Britain
[31] 41,302/67

[54] COMPOSITE LENSES
 6 Claims, 4 Drawing Figs.
[52] U.S. Cl...................................................... 350/189,
 350/178, 350/211, 350/234
[51] Int. Cl........................................................ G02b 3/04,
 G02b 3/08, G02b 9/02

............................. 350/189,
 211, 213, 233, 234, 175, 178

[56] References Cited
UNITED STATES PATENTS

| | | | |
|---|---|---|---|
| 2,175,518 | 10/1939 | Djian............................ | 350/223X |
| 2,908,209 | 10/1959 | Marvin et al.................. | 350/175UX |
| 3,049,054 | 8/1962 | Waland......................... | 350/179UX |
| 3,182,576 | 5/1965 | Papke........................... | 350/211X |

*Primary Examiner*—John K. Corbin
*Attorney*—Holman and Stern

ABSTRACT: A lens of large diameter and short focal length comprises a plurality of interengageable elements which are moulded in a transparent material, or in transparent materials having the same refractive index. The elements are interengaged to constitute the required lens.

PATENTED MAY 25 1971

INVENTOR
Harris Vernon Hicks
BY Glascock, Downing &
Seebold
ATTORNEYS

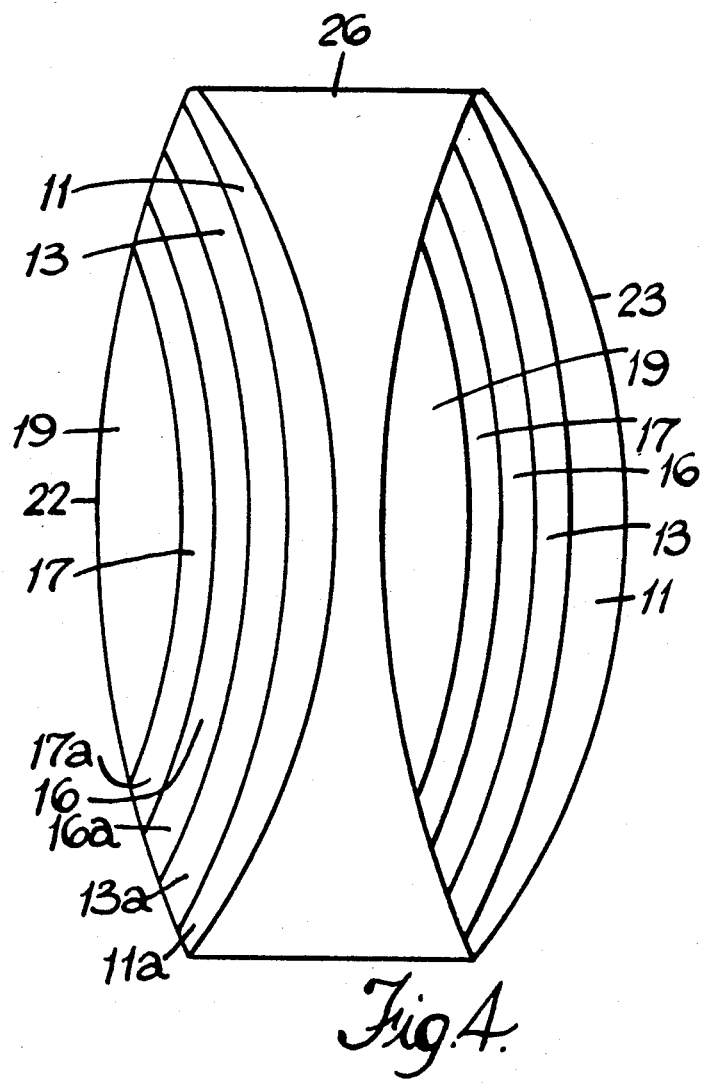

COMPOSITE LENSES

This invention relates to lenses of large diameter and short focal length.

A conventional lens having a large diameter and a short focal length necessarily has a large axial thickness. When such a lens is moulded, owing to the large volume of material at the central portion of the lens shrinkage and consequential distortion of the central portion of the lens occurs.

It is an object of the present invention to provide a lens of large diameter and short focal length wherein the danger of distortion of the lens due to shrinkage during manufacture is minimized.

A lens according to the invention comprises a plurality of interengageable elements mounded in a transparent material or in transparent materials having the same refractive index, the elements being interengaged to constitute the required lens.

In the accompanying drawings,

FIG. 4 is a sectional view of lens combination utilizing a pair of lenses as shown in FIG. 1.

Figure 1:
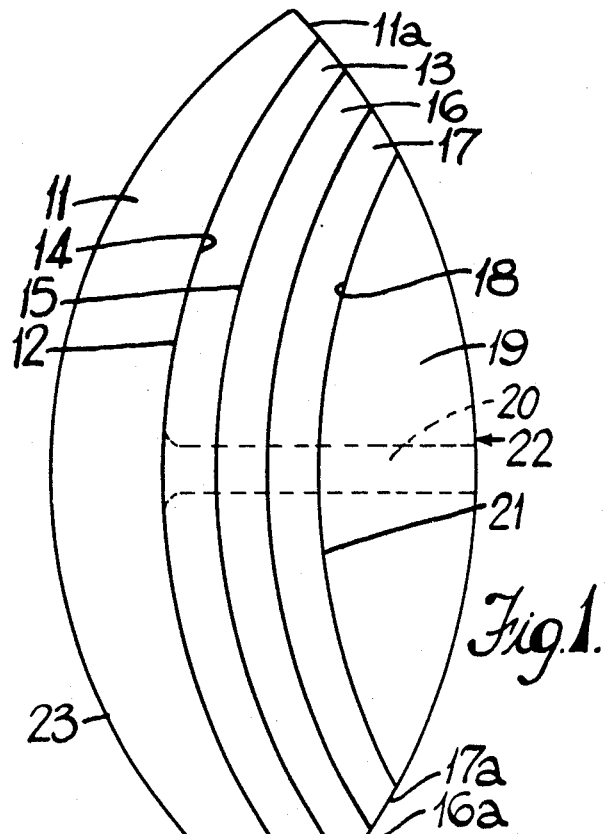
FIG. 1 is a sectional view of a lens according to one example of the invention.

Referring first to FIG. 1 of the drawings, the lens includes a first element 11 moulded in a transparent synthetic resin material and having a part spherical concave surface 12. Engaged with the surface 12 of the element 11 is a complementarily shaped convex surface 14 of a second element 13. The element 13 is moulded in the same material as the element 11 and includes a surface 15 parallel with the surface 14. Engaged with the surface 15 of the element 13 is a third element 16 similar to the element 13 but smaller than the element 13 and similarly engaged with the element 16 is a fourth element 17 similar to the element 16 but smaller than the element 16. Engaged with the concave surface 18 of the element 17 is a complementarily shaped convex surface 21 of a fifth element 19. The element 19 is moulded in the same material as the other four elements and has a convex surface 22 opposite the surface 21. The peripheral surfaces 11a 13a 16a and 17a of the elements 11, 13, 16 and 17 and the surface 22 of the element 19 are such that they constitute a part spherical surface of the lens, the other surface of the lens being the surface 23 of the element 11. The surface 23 is so shaped that the lens is aspherical, that is to say the lens exhibits minimal spherical aberration.

In order to eliminate air gaps between the elements 11, 13, 16, 17 and 19 which would lower the coefficient of transmission of the lens, the mating surfaces of the elements are coated with a transparent liquid which fills the air gaps when the elements are interengaged. The liquid has substantially the same coefficient of refraction as the material or materials in which the elements are moulded. A suitable liquid for example is supplied by Midland Silicones Ltd., under their code No. M.S. 200. and an alternative liquid is a silicone encapsulant, also sold by Midland Silicones Ltd., under their code No. D.P. 2628.

It will be appreciated that since each of the elements has a small axial thickness they can be moulded substantially without distortion owing to shrinkage.

The elements can be held together by a metal shell which also serves a mounting means for the lens in use, the surface tension effects of the liquid between the elements aiding the action of the shell in maintaining the elements in engagement.

Figure 2:
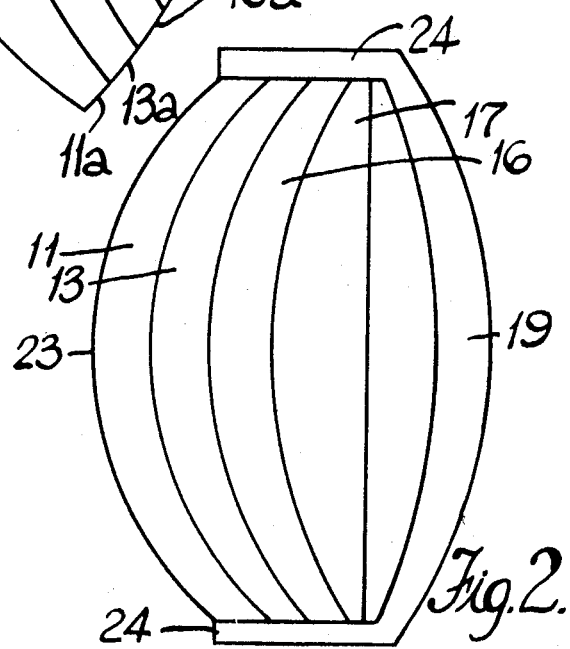
FIG. 2 is a sectional view of a modification of the lens shown in FIG. 1.

In the modification shown in FIG. 2 the outer element 19 is formed with an integral, peripheral, axially extending wall 24 with which the peripheries of the elements 11, 13, 16 and 17 are engaged and the elements 11, 13, 16 and 17 are not of constant thickness. The wall 24 serves to locate the elements 11, 13, 16 and 17 in their correct positions and relieves the necessity of shaping the peripheral surfaces of the elements to constitute part of the optical surface of the lens.

In a further modification shown in dotted lines in FIG. 1 the element 11 is moulded with an integral rod 20 extending axially from its surface 12, and each of the elements 13, 16, 17, 19, is moulded with an axial bore, the elements 13, 16, 17, 19 being threaded onto the rod of the element 11 to assemble the lens.

As described above, the surfaces of the elements of the lenses can be parallel so that the elements are of constant thickness or the elements can be so shaped that their thickness adjacent their peripheries is different to their thickness adjacent their peripheral axes. The shapes of the elements is dependent upon the properties of the lens to be produced. Provided that the difference between the axial thickness and the peripheral thickness of the elements is not too great, then the elements can be moulded substantially without shrinkage and distortion.

Figure 3:
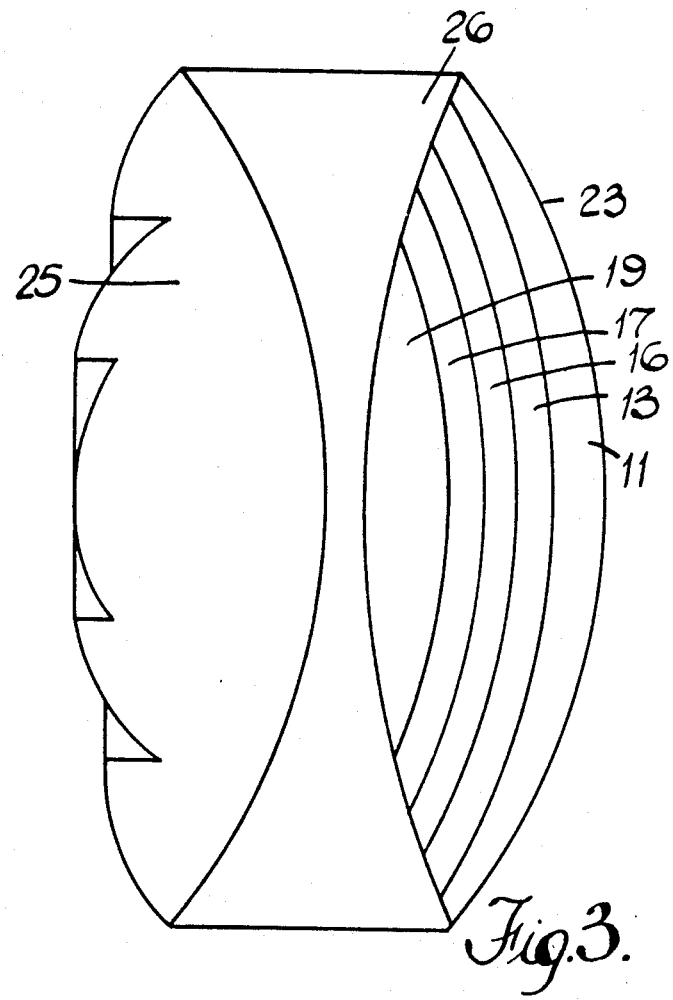
FIG. 3 is a sectional view of a lens combination utilizing a lens as shown in FIG. 1.

A large diameter, short focal length, aspherical lens as described above can be used as one of the outer elements of a three element achromatic lens combination. In one example of such an achromatic lens combination, as shown in FIG. 3, the individual elements 11, 13, 16, 17, 19 of the aspherical lens are moulded in transparent polymethylmethacrylate and are assembled. The other outer element 25 of the achromatic lens is also moulded in polymethylmethacrylate, but in the form of an echelon lens, and sandwiched between the two outer elements is an inner element 26 moulded in transparent polystyrene generally in the form of a concave lens, one surface of the inner element 26 being complementary to the surface 119, 13a, 16a, 17a, 22 of the aspherical lens and the opposite surface of the inner element 26 being complementary to the convex surface of the echelon lens 25.

The dispersive powers of polymethylmethacrylate and polystyrene are sufficiently different that assuming that the focal lengths of the three elements are correctly proportionate to one another then the lens combination will be achromatic.

It will be appreciated that both outer elements of a three element achromatic lens combination could be constituted by large diameter short focal length aspherical lenses as described above, such a lens combination being shown in FIG. 4, and wherein the two lenses constituting the outer elements are moulded in polymethylmethacrylate and the lens constituting the inner element 26 is moulded in polystrene.

In the two achromatic lens combinations described above the mating surfaces of the lenses are coated with the liquid M.S. 200 or the encapsulant D.P. 2628 to eliminate air gaps between the lenses.

I claim:

1. An improved composite lens of short focal length and large diameter comprising a plurality of interengageable elements moulded in a transparent material, or in transparent materials having the same refractive index, the elements being interengaged to constitute the required lens, and axially extending location means integral with one of said interengageable elements and engageable with the other elements to locate said other element in the desired position with respect to said one element, said means comprising a rod integral with one of said outer elements of the outer elements of the lens and extending through the remaining elements.

2. A lens as claimed in claim 1 wherein the mating surfaces of the elements are coated with a substance which eliminates air gaps between said mating surfaces without materially affecting the optical properties of the lens.

3. A lens as claimed in claim 1 wherein one of the outer surfaces of the lens is shaped to render the lens aspherical.

4. An achromatic lens combination utilizing a lens as claimed in claim 1 as one of the outer elements of the lens combination.

5. A lens combination as claimed in claim 4 wherein the other outer element is constituted by a moulded echelon lens.

6. An achromatic lens combination utilizing a pair of lenses as claimed in claim 1 as the two outer elements of the lens combination.